Oct. 21, 1969     L. BLENDERMANN     3,473,565
SHOCK ABSORBER FOR LIQUID FLOW LINES
Filed May 25, 1966     7 Sheets-Sheet 1
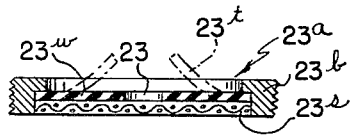
FIG. IA
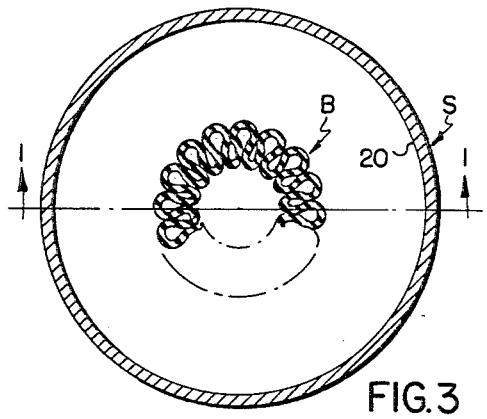
FIG. 3
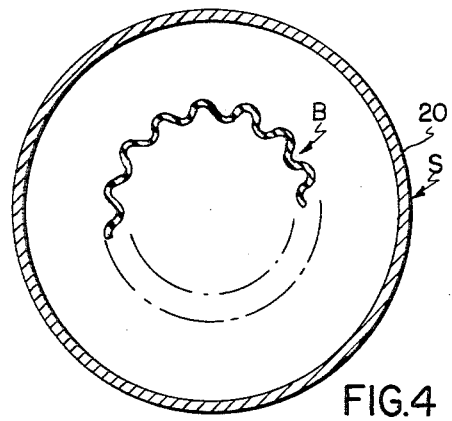
FIG. 4
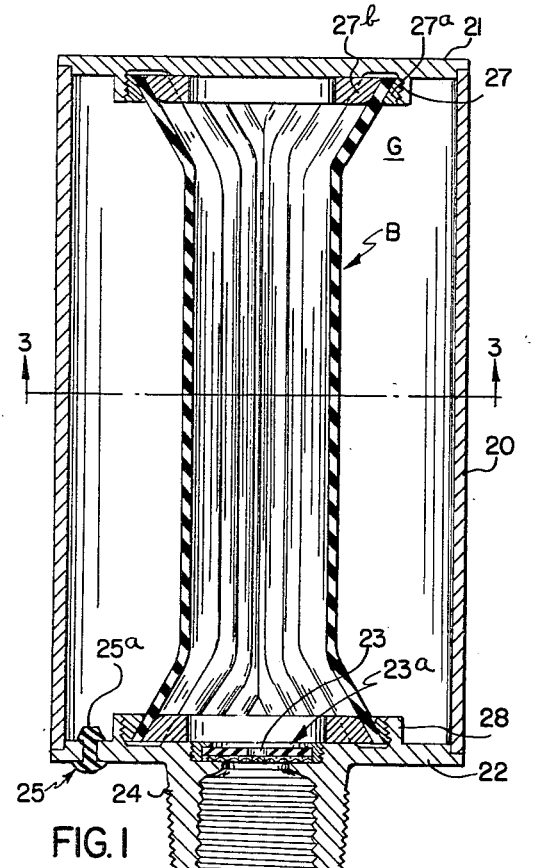
FIG. I
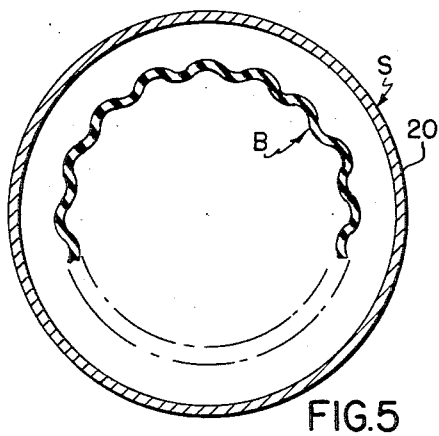
FIG. 5
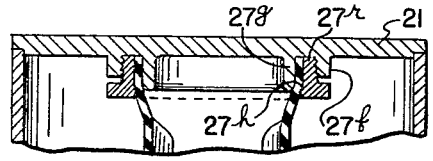
FIG. IB
INVENTOR
LOUIS BLENDERMANN
BY
*Ely and Golrick*
ATTORNEYS Oct. 21, 1969   L. BLENDERMANN   3,473,565
SHOCK ABSORBER FOR LIQUID FLOW LINES
Filed May 25, 1966   7 Sheets-Sheet 2

INVENTOR
LOUIS BLENDERMANN
BY
*Ely and Golrick*
ATTORNEYS

Oct. 21, 1969   L. BLENDERMANN   3,473,565
SHOCK ABSORBER FOR LIQUID FLOW LINES
Filed May 25, 1966                                7 Sheets-Sheet 3

INVENTOR
LOUIS BLENDERMANN
BY

ATTORNEYS

Oct. 21, 1969   L. BLENDERMANN   3,473,565
SHOCK ABSORBER FOR LIQUID FLOW LINES
Filed May 25, 1966   7 Sheets-Sheet 5

INVENTOR
LOUIS BLENDERMANN
BY
ATTORNEYS

Oct. 21, 1969  L. BLENDERMANN  3,473,565
SHOCK ABSORBER FOR LIQUID FLOW LINES
Filed May 25, 1966  7 Sheets-Sheet 7
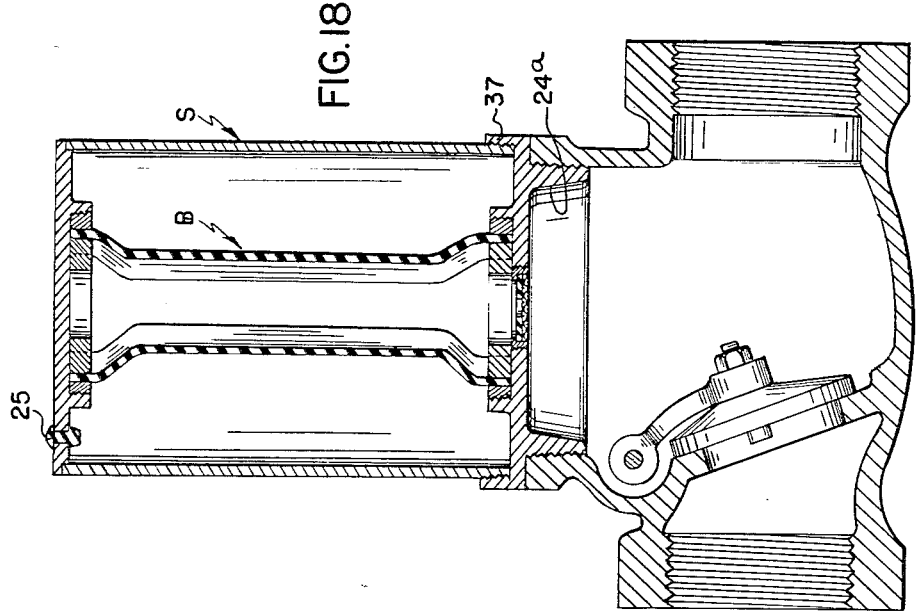
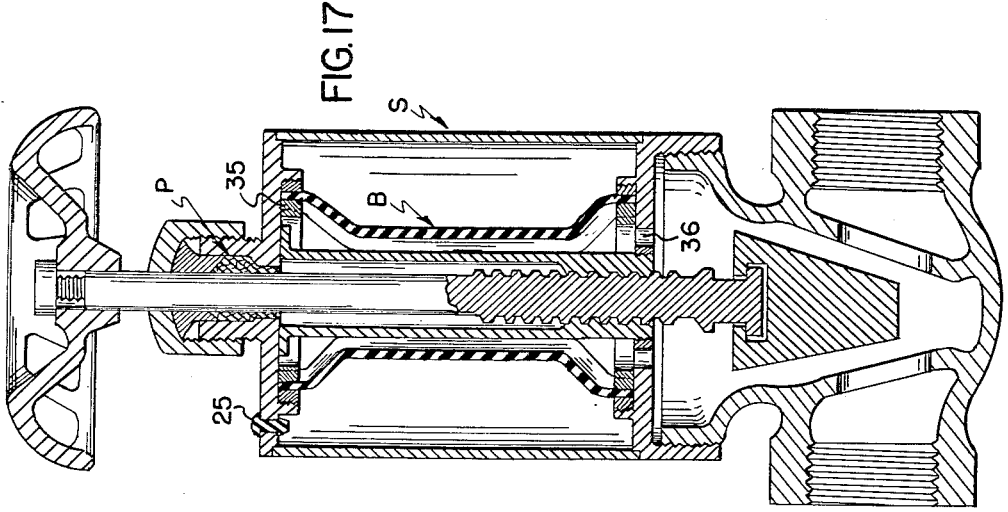
INVENTOR
LOUIS BLENDERMANN
BY
*Ely and Dobrick*
ATTORNEYS

United States Patent Office

3,473,565
Patented Oct. 21, 1969

3,473,565
SHOCK ABSORBER FOR LIQUID FLOW LINES
Louis Blendermann, North Palm Beach, Fla., assignor to Josam Manufacturing Co., a corporation of Delaware
Filed May 25, 1966, Ser. No. 552,796
Int. Cl. F16l 55/02, 55/04
U.S. Cl. 137—593                      27 Claims The present invention is concerned generally with shock absorbing devices for liquid flow lines, with the so-called water hammer arresters, that is, devices used on piping for various liquids, providing a space or chamber in communication with the piping into which a portion of a moving column of liquid may escape the piping against an increasing resistance upon a sudden closure or shut-off of the flow path, thereby to absorb kinetic energy from the column and prevent undue and harmful rises of pressure which might otherwise rupture or damage the piping or devices connected thereto, or at least minimize or eliminate hammering noises usually attending sudden obstruction of the liquid flow.

More particularly the present invention is concerned with shock absorber devices of the character described containing a volume of gas separated from a liquid receiving space by an elastomeric member basically functioning to prevent loss of the confined gas to the piping by solution, aspiration or other ways, while allowing liquid to enter the device and quickly compress the gas as an energy absorbing medium and subsequently to be expelled by the compressed gas in a prescribed manner more slowly dissipating the energy in a non-objectionable manner.

For simplicity the invention will be described in terms of a shock absorber for a water supply line in the plumbing system of a residence or office building, commonly called a water hammer arrester; it being understood, however, that aspects of or devices embodying the invention are applicable for shock absorbers on high pressure hydraulic fluid lines in industrial applications, fuel lines for jet fuel or gasoline, chemical process lines, or any such piping systems wherein a non-compressible liquid is liable to be moved at such linear velocities and under such conditions that by occurrences such as sudden valve closures in the system there can arise so-called water hammer or high pressure fluid shocks objectionable either because of consequent noise or more generally because of potential damage to the piping or to equipment thereto connected.

Various water hammer arresters or shock absorbers are well known and old in the prior art, including spring loaded movable pistons or diaphrams wherein the liquid kinetic energy is absorbed primarily in a spring, or a piston or diaphram serving essentially as a parition moveable against a restrained volume of gas as the kinetic energy absorbing means. Other forms have utilized an elastomeric member, as a diaphram bag or tube for example, in conjunction with a confined body of gas, with the elastomeric element serving in some degree to absorb energy by strain in expanding against the confined gas under the pressures developed under shock conditions.

More recently developed shock absorbers comprised of a rigid metal housing enclosing a metal or elastomer bellows, axially expanding to avoid as far as possible the stressing of the expansible element as an energy storing process and having its open end secured to a housing inlet adapted to be connected to piping, the space between the bellows and the housing charged with a gas at a pressure selected according to the static pressure expected in the fluid flow line. The bellows assumes a normal axial position intermediate fully extended and a fully contracted positions, under static line pressure conditions. Variations in this basic structure have been necessary including use of a liquid surrounding the lower part of the bellows in housing space, or springs or spacing elements for control or guidance and to prevent collapse and rupture of the bellows. However, these devices have eliminated certain disadvantages of prior absorbers, expensive components or modes of fabrication.

But even the elastomeric axial bellows while avoiding the expense of the more successful metallic bellows constructions per se or of the bellows mounting, and potential failure by metal fatigue or bursting, have still entailed certain disadvantages.

Even as produced by modern plastic fabrication methods by molding at lower costs than metallic bellows, these axial bellows are nonetheless rather costly, and yet do not eliminate the need of other absorber components such as liquid and spring coils for guiding, supporting, or preventing collapse and rupture of the bellows.

By the present invention there is contemplated the use of a novel form of elastomeric bellows which is peripherally expansible and contractible and most advantageously adapted to production by rapid low cost extrusion methods, while retaining the useful features of the axial bellows.

The requisite structure is afforded by a tubular form with longitudinal fluting-like corrugations or pleats, which by virtue of its tubular form and invariant cross section may be extruded to any desired length and extrusion cut into shorter lengths suitable for individual bellows components. This structure therefore provides a cross-section which may be "compressed" from its normal extruded condition or shape by a circumferential accordion-like or bellows action, or extended from its compressed or even normal shape by a "straightening out" of the pleats toward a circular section, which is not however, intended to be attained.

However, the bellows can under particular conditions or requirements of materials be molded and have certain advantages in accordance with the principles of structure herein disclosed. Also the fundamental bellows shape may be produced by extruding operations, and as required, the extruded elements cut to appropriate lengths then may be locally molded at the end regions to particular end shapes desired for attaching the bellows to the surrounding environment of the housing.

It further appears that by use of the shock absorber construction involving the circumferentially radially expansible type of bellows herein described, it is possible to obtain a greater change, for the shock absorbing process, in the volume of the shock absorbing gaseous medium, than would be possible for a given size shock absorber housing with the axially expansible bellows of the type hitherto known having acceptable performance.

In one type of upright type shock absorber embodying the present invention, the top and bottom ends respectively of an extruded bellows member of the type just described are anchored and sealed to top and bottom walls of the housing, with an inlet through the bottom wall connectable to the piping to be served and opening internally to the inside of the bellows. The gas tight housing is then suitably charged with a pressurized gas, such as an inert gas or air depending upon the elastomer used, an elastomer not affected by oxygen being preferred so that air may conveniently be used. It is further contemplated and an advantage of the invention that an "in-line" shock absorber may be provided which is adapted for inclusion as part of the flow path in the liquid flow line to be served, with the liquid passing axially through the bellows as a part of the conduit or piping system.

It appears that the present invention as applied to through-flow type shock absorber structures is advantageous inasmuch as a modification provides a structure affording some degree of sound attenuating ability, merely by including or using in the housing a length of the bellows material or element greater than would ordinarily be used, that is, an over-length resulting in a deflection from a straight to a curved but non-kinked tubular path.

Alternatively in accordance with the invention, in either an upright or "in-line" device, the bellows may be so mounted in the housing that the bellows is internally gas charged with the liquid from the flow line surrounding the bellows. It is further proposed in accordance with the invention to incorporate a through-flow type shock absorber in fittings or components used closely associated with equipment of which the very operation is quite likely to give rise to water hammer or flow shock, or which equipment is particularly to be protected from such shock arising in the piping served thereby. Thus, for example, for automatic washing machines usually connected by flexible hoses to the cold and hot water lines, a device in accordance with the invention may take a hose-like form; or the flexible mechanical vibration insulating or absorbing connectors between the inlet and outlets of pumps and associated piping may take the form of such shock absorbers. Further the bendable or so-called flexible supply connectors used between the terminal point of roughed-in piping in a building and plumbing fixtures connected thereto may also incorporate or take the form of an in-line shock absorber as herein proposed.

Moreover, because a circumferential or radial rather than longitudinal piston-like bellows movement is involved in a shock absorber in accordance with the present invention, the same may be incorporated as a valve bonnet with the stem extending coaxially through the bellows, in supply valves of lines, especially of gate valve type, which are normally left open for long periods of time, during which alone the shock absorbing function and capacity would be required. Further, check valves, particularly back water check valves and the like, having a top access opening through which the swing valve element is initially installed and thereafter serviced, can include as a component attached as the cover thereof, an upright type of shock absorber in accordance with the invention.

It is therefore a general object of the present invention to provide an improved type of shock absorber involving an elastomeric bellows element wherein a charged confined volume of gas serves as the essential energy absorbing medium, with the elastomeric element serving essentially to confine and maintain the gas volume, isolating it from the fluid flow line served by the shock absorber, with no reliance upon stressing of the elastomeric element for the purposes of energy absorption in the elastomer itself.

A more particular object is the provision of a shock absorber of the type described including an elastomeric expansible component adapted for low cost production and fabrication especially by extrusion methods.

A still further object is the provision of a shock absorber of the character described adapted for use as an in-line device, that is, for incorporation into a liquid flow line as part of the flow path.

A still further object is the provision of a shock absorber of the character described adapted for attenuation of sound propagated transmission through the liquid in piping apart from the particular noise attendant upon water hammer.

A still further object of the invention is the provision of the novel shock absorber structure, wherein a greater change of volume of the shock absorbing medium is obtainable for a given size of housing, or which can serve as an accumulator.

Other objects and advantages will appear from the following description and the drawings wherein:

FIG. 1 is a vertical axial section of an upright water hammer arrester or shock absorber unit of the invention, gas charged but not connected to the piping to be served, therefore with the bellows in extreme radially contracted condition;

FIG. 1A is an axial section showing a back flow control orifice device incorporated in the structure of FIG. 1;

FIG. 1B is a fragmentary detail of the top region of a unit such as appears in FIG. 1, but showing a manner of securement for the bellows end which is applicable to either end in this or subsequently shown devices with similar bellows forms;

FIG. 3 is an outline transverse section taken along the line 3—3 in FIG. 1, intended to show merely the compressed bellows position in relation to the surrounding housing;

FIG. 4 is a view similar to FIG. 3, but showing the normal position or condition of the bellows upon initial assembly of the unit before gas charging;

Figure 8:
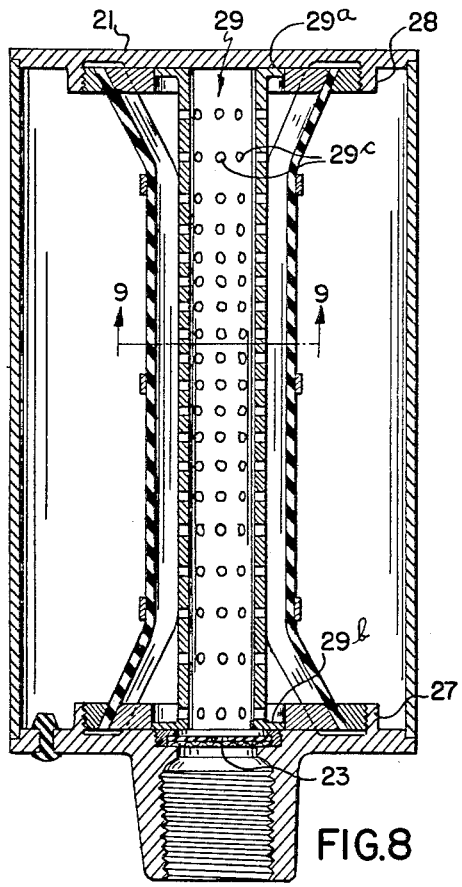
Figure 9:
Figure 13:
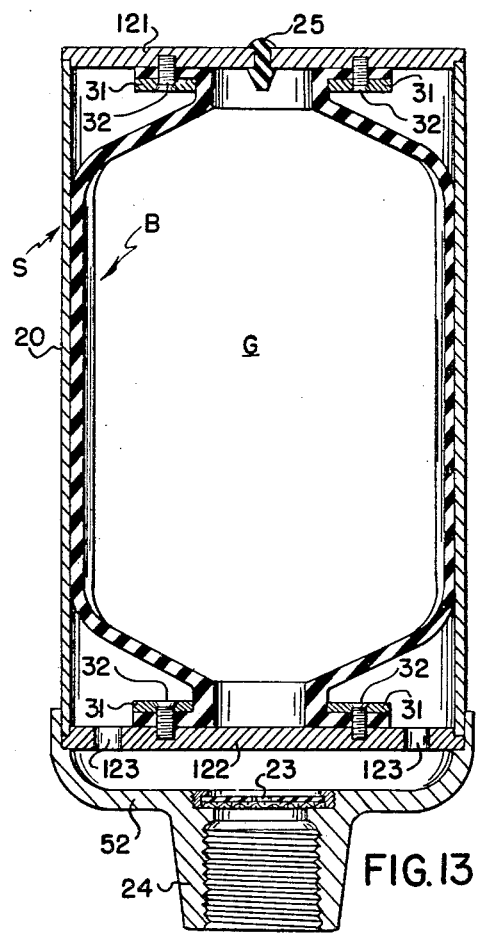
Figure 2:
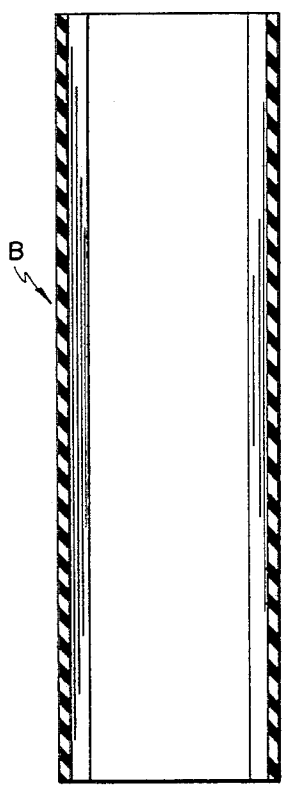
FIG. 2 is a vertical section through the elastomeric bellows sleeve element of FIG. 1, in its normal or "as extruded" shape.
Figure 6:
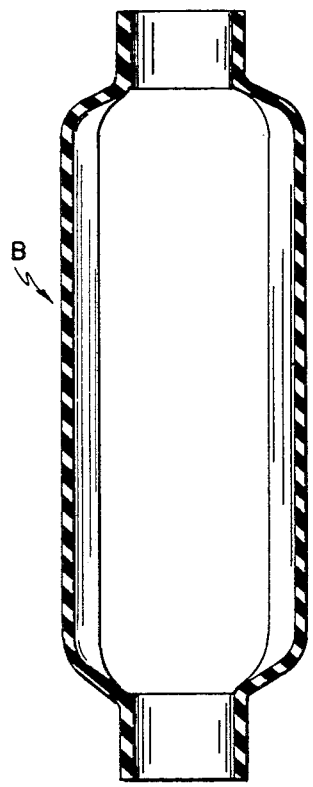
Figure 7:
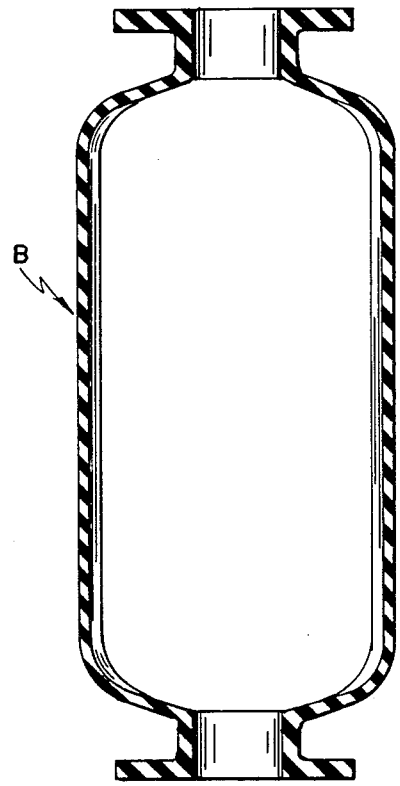
Figure 10:
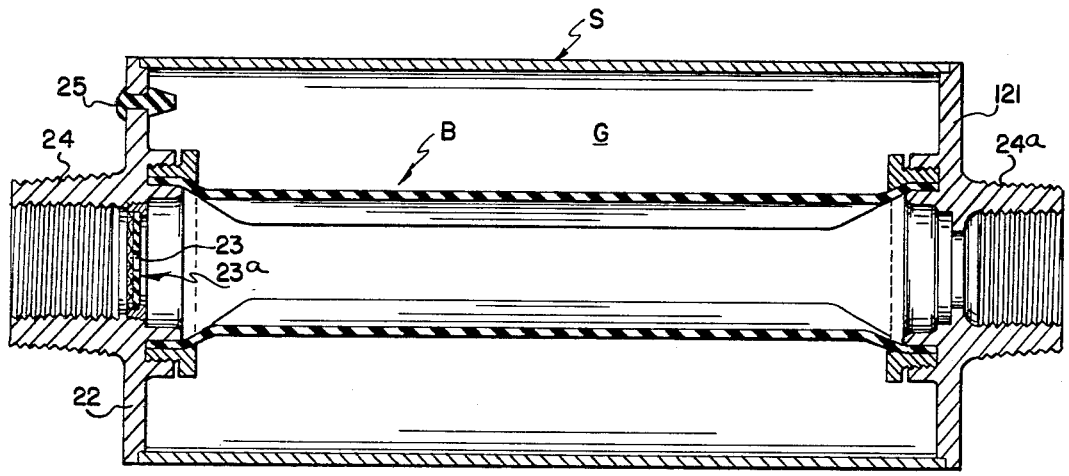
Figure 12:
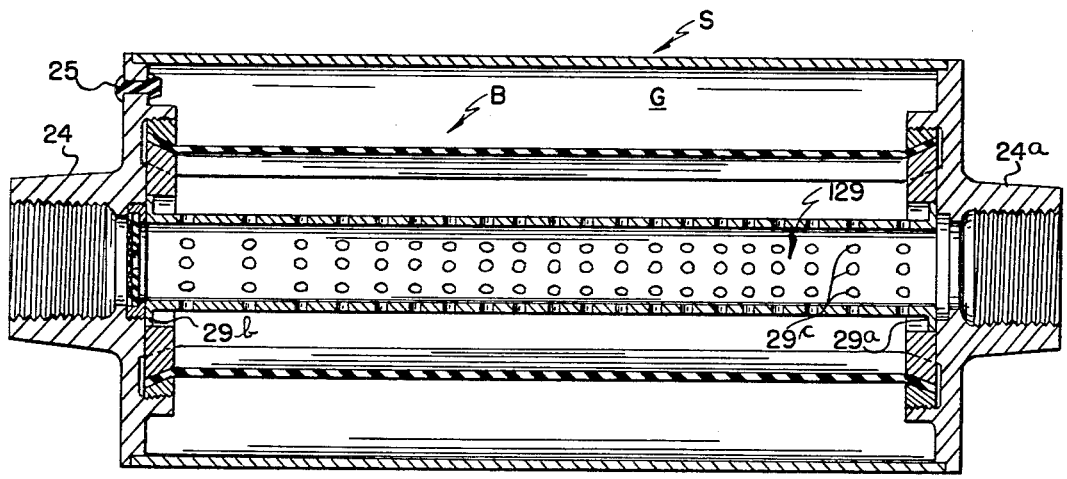
Figure 11:
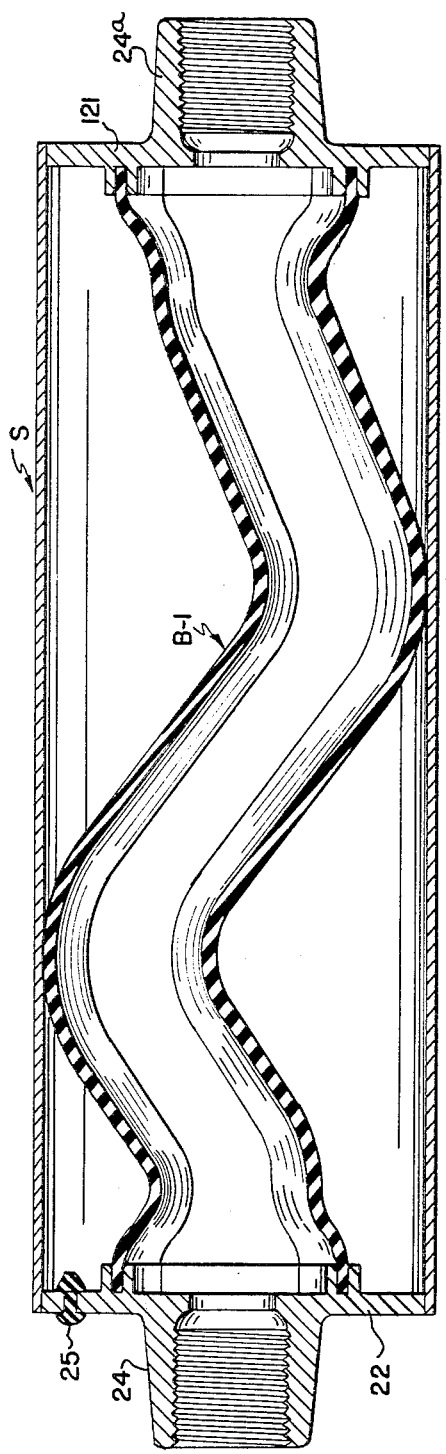
Figure 14:
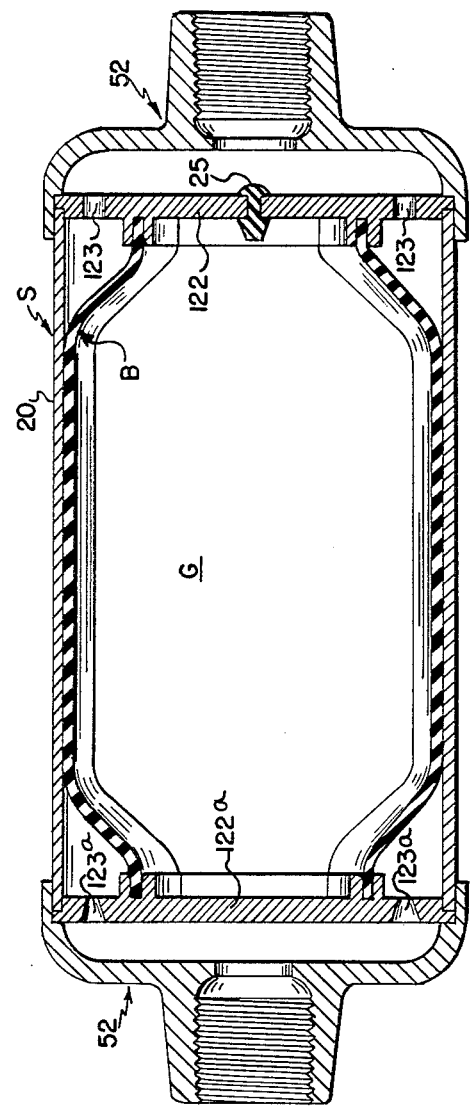
Figure 15:
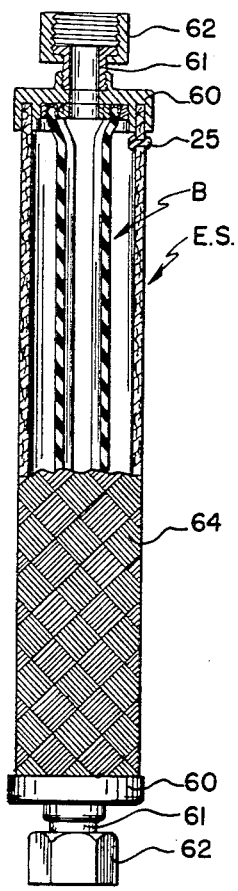
Figure 16:
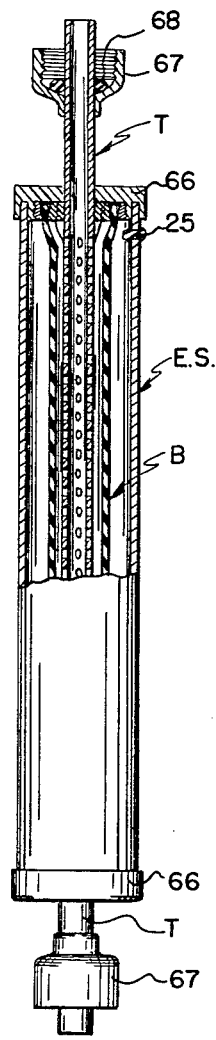
Figure 15A:
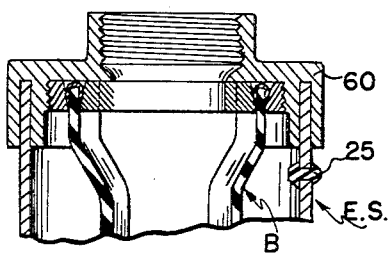

FIG. 5, similar to FIGS. 3–4, shows the bellows in an expanded position such as it might assume under the application of a high pressure or shock wave thereto;

FIGS. 6 and 7 are longitudinal sections similar to FIG. 2 showing other bellows forms in accordance with the present invention;

FIG. 8 is a modification of FIG. 1 to include a coaxial metering insert sleeve;

FIG. 9 is a transverse section taken as indicated by the line 9—9 in FIG. 8;

FIG. 10 is an axial section somewhat similar to that of FIG. 1 through an in-line device;

FIG. 11 is a modification of FIG. 10 to obtain a degree of sound attenuation;

FIG. 12 is a modification of FIG. 10 to include a metering insert sleeve, but with the unit shown in uncharged condition;

FIG. 13 is an axial section of an upright shock absorber unit wherein the bellows is internally gas-charged;

FIG. 14 is a unit generally similar to that of FIG. 13, but in a through-flow form;

FIG. 15 in partial axial section shows the invention embodied in an elongated somewhat flexible or bendable structural form as might be used in a connecting hose or a flexible connector between a supply piping and an appliance or other equipment connected thereto;

FIG. 15A is a detail of the device shown in FIG. 15;

FIG. 16, in partial longitudinal axial section an embodiment of the invention in a supply connector useable between a roughed-in plumbing and a fixture such as a lavatory or the like;

FIG. 17 is a generally axial vertical section through a gate valve incorporating the invention and intended to be used as a supply valve on a water line or the like; and FIG. 18 is a generally vertical axial section through a check valve embodying the invention.

In the various figures of the drawings and the following descriptions thereof, similar parts are designated by similar reference characters.

In FIG. 1 of the drawings there is shown as one embodiment of the invention, a so-called "upright" water hammer arrester to be connected to but not become part of the normal flow path of liquid in the piping served thereby. The unit comprises as essential components the circumferentially expansible and contractible bellows sleeve B, of suitable elastomeric material, and a substantially rigid gas-tight shell S, to the top and bottom walls 21 and 22 of which are secured the opposite bellows ends firmly anchored in gas-tight sealed relation, to define a liquid-receiving interior space communicating through a bottom wall central throttling aperture 23 with the water supply line to which the unit is connected by means of the inlet 24, here shown as an integral internally and externally threaded projection of the bottom wall affording a convenient option in attaching to a line fitting. The throttling orifice may be provided with a constricted opening in end wall member 22 as cast or preferably provided by a back flow control orifice device 23a shown in FIG. 1A. The orifice insert 23a comprises a male-threaded body ring 23b threaded into a recess in 22 over the inlet; a washer-like elastomeric disc 23w concentrically perforated to provide opening 23, with four 90° spaced slits radiating from 23 to form upwardly deflectable disc tongues 23t, and a stainless steel mesh screen disc received in the bottom of the body ring and by pressure holding the disc 23w peripherally clamped against a top inward shoulder of 23b, either by a bottom edge of 23b rolled over the screen or by pressure on the screen bottoming against the recess in member 22 as the insert is secured in place. On inflow the opening enlarges by the tongue displacement shown in dashed lines; on outflow, with the tongues in normal position supported by the screen, presenting the restriction of 23. Also the unit has a charging insert device 25 communicating with the gas space G, here provided by a bore through the bottom wall sealed by an elastomeric plug 25a with flat shoulders of its headed outside end and tapered-head insertable inside end bearing on the opposite wall faces around the aperture and with its shank expanded radially into contact with the bore wall, thereby achieving a gas-tight seal yet affording a location for inserting a gas injection needle which upon removal of the needle is self-sealing. Since suitable devices of this character are well known and commercially available, and the particular form per se is not part of this invention, therefore the structure will be no further detailed.

Figure 1C:
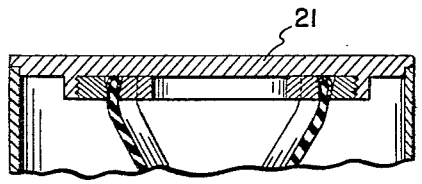
FIG. 1C is a fragmentary detail similar to FIG. 1B showing still another mode of bellows securement.
Figure 1D:
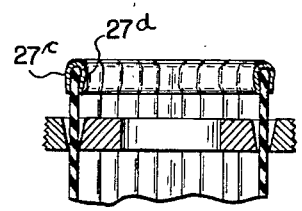
FIG. 1D is a detail showing the mode of assembly for the structure of FIG. 1C.

In FIG. 1 the shell S is shown as comprised of a cylindrical metal wall 20 closed at opposite ends by the disc-like top and bottom wall elements 21, 22 sealed thereto in gas-tight relation, which elements have on their opposed inner faces bellows-end securing means. The latter may take not only the form shown in FIG. 1, but also of FIGS. 1C-1D or of FIG. 11 for the FIG. 2 bellows form; or with the bellows of FIG. 6, the form of FIG. 1B, or even the general arrangement of FIG. 1C.

In FIG. 1 the integral circular flange 27 (or flange 28 at bottom) is internally threaded to receive an outer clamp ring 27a having a symmetrically sinuous, but sloped, inner peripheral edge which cooperates with the similarly sinuously shaped external periphery of inner clamp ring 27b to secure the margin of the bellows in flared condition sandwiched therebetween. Just inward of the flange 27 the face of 21 is relieved, so that with 27b bottoming, clearance is afforded for advance of 27a and if needed for the edge of the bellows whereby a wedging clamping action is secured.

In the form of FIGS. 1C-D, the clamping or anchoring means again involves an outer ring 27c and inner ring 27d with generally complementarily sinuous internal and external peripheral surfaces, but with these surfaces sloped oppositely, i.e., to form a divergently walled sinuous slot therebetween in which the end of a bellows sleeve is held by virtue of a sinuous formed annular sheet metal anchor device, somewhat ovoid in radial section, embracing the inside and outside surfaces of the end margin of the bellows to result in an enlargement which is located between the divergent ring walls. Tensile forces tending to pull the bellows end out of the slot, in drawing the anchor device 27x against the walls in the direction of convergency, squeeze the free edges of the device toward each other the more firmly to grip the bellows end. A similar arrangement of non-sinuous divergent rings could be used with the cylindrically ended bellows of FIG. 6.

In FIG. 1B, the end members 21 of the unit (or 22 at the bottom) is provided with a pair of concentric circular flanges 27f, 27g defining a circular slot, wherein is received a male threaded clamp ring 27r threaded into flange 27f to clamp the cylindrical end bellows between a concave lip formation 27h at the inner periphery of the ring and a rounded edge of the flange 27g. Here as also in the other clamping arrangements described herein, upon assembly the clamped surfaces of the bellows ends can also be coated with adhesive to provide a bonding-sealing as well as mechanical clamping-sealing action.

In FIGS. 11 and 14, as another anchoring means, the end members of the housing have on their opposed inner faces respective circularly closed sinuous projecting integral formations 27, 28 each with a sinuous corresponding in shape and width to the shape and wall thickness of the bellows tube in its normal shape apparent in the cross-section view in FIG. 4; in which slots the ends of the bellows sleeve are secured and fluid-tightly sealed by any apt means. Such means may be an adhesive pre-applied thereto before insertion which upon setting up will assure adequate anchoring and bonding between the bellows and the end plates. Alternatively, some sealing material may be pre-applied to the slots and/or the bellows, the bellows ends inserted in the slots, and then a sinuous wedging strip be driven in either internally or externally between the bellows end and the adjacent slot wall.

The assembly of a unit may proceed in various ways, depending upon how it is desired to produce the housing form. Thus the bellows may be secured to the end members, and if used, after bonding or sealing material has set up to the requisite degree, where the shell cylindrical portion 20 is structurally separate from wall 21, it is slid over the end plate 22 to seat against a rabbeted edge formation on the plate 21 and then affixed and sealed to the end wall discs or plates. If suitable heat localizing expedients are used, these respective joints may be brazed or welded to provide the gas-tight enclosure; or certain modern high strength durable adhesives may be used for the purpose; but more conventional sealing and securing structures may be used between the cylindrical shell wall 20 to the respective end elements.

Thereafter the plug 25a is inserted in the aperture opening into the annular gas space defined between the cylindrical wall 20, the bellows sleeve B and the respective end walls, and thereupon the device is charged through a cannula needle piercing the plug 25a with air or an inert gas to the intended design pressure, e.g., in a range of 30–60 p.s.i. for most residential water line static pressures. Before pressurizing, in the assembled unit the bellows B would have a transverse cross sectional position and shape indicated in FIG. 4, being substantially in its straight as-extruded condition indicated in FIG. 2, or in FIG. 12, which is an "in-line" unit hereinafter described.

After charging the bellows takes shape and position as indicated by the axial section in FIG. 1 and cross section as shown in FIG. 3, until there is a liquid static pressure applied from a water line. With the device on the water line at a normal static pressure the bellows will return to the shape of FIG. 4 approximately, when the internal static line pressure and the gas charging pressure are equal. Preferably, however, the charging pressure exceeds the static pressure, so that even under line pressure the bellows takes the shape indicated by FIG. 3. When on the line and subjected to the effects of say a quick closure of a near-by valve on the line, some of the moving water column will flow into the bellows, with some moderating throttling provided if desired by a restriction in the inlet, say below 23, the bellows circumferentially extending or expanding, towards maximum expanded position indicated in FIG. 5, compressing the charged gas in the gas space, whereby kinetic energy of the moving but obstructed water column is converted into the potential energy of the gas at reduced volume and higher pressure. Thereafter, of course, the fluid will be expelled against the static pressure then achieved in the line by expansion of the gas G delivering up its potnetial energy, and thereby compressing circumferentially or radially the bellows towards its start position. The full cycle behavior or movement expectedly and usually has a damped oscillatory character as is usual in the operation of a device of this general type.

The change in bellows shape is basically one of an unfolding or folding of the "pleated" material, and although in strict theoretical sense there would be some energy conversion in the elastomeric material itself by the shape changes, this actually is not relied upon for the required energy conversion and is quite incidental, even as it were, accidental, to the essential energy conversion process by the gas, which is the fundamental characteristic of the device.

Upon an insurge of water valving tongues 23t lift from the seat to afford a maximum ready flow into the bellows, but upon drop of the high line pressure and incipient outflow and return of the bellows to normal position, tongues 23t return to normal position constraning the outflow to pass through the restrictive metering orifice 23, thereby effecting an immediate dampening of the oscillatory phenomenon involved in the line pressure changes by virtue of the consequent restrained expansion of the gas G as a slower rate than the oriignal compression.

Although the bellows element of FIGS. 1–5 has a constan tcross section from one to the other end in its normal unstressed condition, as it advantageous since it can be fabricated at low cost by extrusion of long continuous lengths simply cut to desired length the basic extrusion, with appropriate choice of the elastomeric material, it also may be used to produce, for example, such end forms as in FIGS. 6–7, which might be desired for particular environments or mountings. Thus a length of extrusion as shown in FIG. 2 may have its ends shaped and formed in suitable molding equipment to provide bellows elements with shapes as shown in FIG. 6 or FIG. 7.

Though for hot and cold water service Du pont's "Nordel" elastomer is suitable for bellows, for petroleum product lines B. F. Goodrich Rubber Company's "Hycar" or like hydrocarbon resistant material is required, this being highly suitable for all applications including water.

The device in FIG. 8 is that of FIG. 1 with merely an added fluted, perforated tubular metering insert sleeve element 29, which has a cross sectional shape (FIG. 9) somewhat similar to that of the bellows and flanged ends 29a, 29b, received respectively within and positioned axially by the inner rings 27a, 27b, with the bellows sleeves lightly longer than the inside face spacing of the end members, so that rubber bands 30 may constrict the bellows about 29 to faciltate assembly. At successive transverse planes along the length of the metering tube insert, metering perforations 29c and 29d are formed in the inner and outer crests respectively of its convolutions, these planes of location being closely spaced in one small group immediately adjacent the inlet aperture 23, and over the rest of the tube having a high concentration near mid-length, from which towards each end the successive planes are spaced increasingly.

The insert 29 with its perforations serves the same function as that of a constrictive orifice at 23, and further of distributing the effect of a fast pressure rise or influx of liquid over the entire length of the bellows; as well as affording a degree of internal support of the bellows as it contracts radially under the expanding gas pressure.

In FIG. 10 the invention is embodied in a so-called in-line or through-flow water hammer arrester in which the unit provides a part of the water piping flow path. The device of FIG. 10 is basically similar to that of FIG. 1, with bellows clamped as in FIG. 1B. Here in place of the solid top end wall 21 of FIG. 1, the end wall 121 is essentially identical with the opposite end wall 22 (without duplicating the charging device 25), to provide a second piping connection 24a in communication through the central fluid flow aperture 23a with the second end of the axial bellows sleeve B, whereby the bellows B is incorporated as a portion of the water line wherein the device is inserted. Here again the unit is shown as charged but not subjected to an internal static water pressure. This device will perform essentially identically with that shown in FIG. 1.

FIG. 11 shows essentially the device of FIG. 10 with a modification of the bellows anchoring, previously described and with the shell somewhat elongated but including a bellows B–1 which has straight length longer than the distance between the end walls 22 and 121, whereby the bellows (shown in outline only) without kinking assumes a rather tortuous shape or condition to attenuate water transmitted sound other than or additionally to the water hammer noise, such as pumping noises. Though, of course, there is a friction pressure drop engendered by the very irregularity of the flow path, the sound wave front in the water column will repeatedly impinge upon the walls of the bellows at each point or each region where a curve occurs for adsorption of energy.

The in-line water hammer arrester unit of FIG. 12 differs from FIG. 10 only by bellows securing as in FIG. 1 and by inclusion of the metering insert sleeve 129, identical in structure and function with 29 in FIG. 8 except that the increased axial spacing of the locations of the sets of metering apertures 29c and 29d is symmetrical about a central transverse plane. However, in FIG. 12 the sleeve or bellows B is shown in its so-called normal position or condition which it would have before the device charged with gas or under balanced gas-water pressures. In this case, however, obviously the throughflow path of water through the water hammer arrester device is going to be basically bounded and determined by the cylindrical wall of the insert 129.

In FIGS. 13 and 14 the upright and in-line water hammer arresters differ primarily from those hitherto described by having the energy absorbing gas charge or medium enclosed within the interior of the bellows B; but in FIG. 13 there is also shown a manner of bellows anchoring adapted particularly to the flanged end bellows of FIG. 7 here used.

In FIG. 13 the cylindrical shell 20 is closed at top and bottom ends by flat end wall discs 121 and 122 to and against which the flanged ends of bellows sleeve B, having a normal shape as shown in FIG. 6, are each secured by a flat ring 31 and a plurality of circumferentially spaced screws 32 through the ring and flange and threaded into the end disc; and the housing or shell has further a bottom cap-like structure 52 with a wide top end sealed and secured on the lower portion of the cylindrical shell 22. The lower end of the cap 52 is reduced into the threaded inlet connection 24 from which water may pass through device 23a and then through a series of say four apertures 123 circularly spaced in plate 122 ouwtardly of the elastomeric sleeve end anchoring location 27, into the water receiving space defined between the bellows sleeve B, cylindrical wall 20 and the end walls 121 and 122. The axial corrugations in the bellows provide longitudinal communication between the end fluid spaces even when the sleeve is in its maximumly outwardly extended condition as shown in the drawing. Here the charging device 25 is centrally located in top plate 121.

In absorbing shock energy or kinetic energy under shock conditions in the water line, the water entering the device passes through the device 23a therewith opening and moves the bellows sleeve inwardly compressing the gas, with restriction of the subsequent outflow with the tongues of 23a seating through the metering orifice 23 for a mode of operation essentially identical to the aforementioned devices.

The in-line or through-flow water hammer arrester in FIG. 14 basically duplicates at both ends the bottom end structure of FIG. 13, comprising an end closure disc or plate 122a and a cap 52 at both ends. Though the orifice 123 in the right plate 122a are untapered as in FIG. 13, the corresponding apertures 123a in the left or inlet end plate 122a are tapered flow metering apertures; and a greater number are provided in each plate to secure the requisite flow area from the left inlet to right outlet. The charging device 25 is centrally located in one of the discs 122a. Of course, when the device of FIG. 14 is included in a water line and subjected to static pressure of the water line, the bellows (here shown only in outline form) will be moved inwardly towards its normal condition, so that there is an adequate flow path provided between the bellows sleeve and shell. The operation of the device of FIG. 14 will be fundamentally similar to that shown in FIG. 13.

FIGS. 15 and 16 represent a departure in the disclosed devices from what has been previously discussed inasmuch as either device as a whole is not utterly rigid, but may as a unit be flexed or bent to some degree, and is relatively quite elongated as might be used for hoses connecting washers or the like to supply lines, for mechanical vibration isolation couplings between piping and a device connected thereto, such as a pump, or for a fixture supply connection. In all such connecting components in their ordinary uses, it would be most advantageous to include the function of a shock absorber or water hammer arrester which desirably is installed close to a washer or other water utilizing apparatus, to a toilet bowl tank or flush device, to sink or lavatory faucets or the like where water hammer may arise, or close to pumps, for example, which are to be protected against water hammer.

The basic structure of FIG. 15, useful for example, in washer connecting hoses and mechanical vibration isolating devices, incorporates a flexible elastomeric shell ES reinforced as may be desired in accordance with prior practices, a long preferably extruded, elastomeric bellows sleeve B similar to that of FIG. 2 but much more elongated, and substantially identical top and bottom end closure and coupling assemblies AS; the latter providing both end walls to which the elastomeric shell and bellows sleeve are connected and also threaded coupling means for connection to the piping and to the device or apparatus with which used. One of the assemblies AS may include the charging plug insert 25 through its body 60 for gas pressurizing the space between shell and bellows as usual; or 25 may be inserted through the shell ES.

Each end assembly AS comprises a thick disc-like body 60 centrally aprtured and having a coaxial tubular extension 61 to provide a water passage, whereon an internally threaded coupling cap 62 is rotatably received and retained by outwardly flanging the end of the extension 61. The inner face of the disc portion 62 is circularly concentrically grooved near its outer margin and also immediately around the central passageway to receive respectively the ends of the elastomeric shell ES and of the bellows sleeve B secured therein by any suitable mechanical or adhesive means or any apt combination of such means. The elastomer shell ES may be a tube of a tough high tensile elastomeric material which by characteristics and thickness is sufficient to provide a gas shock absorbing medium-containing shell of adquate inextensibility for the purpose, while permitting the necessary degree of flexibility for the intended use. On the other hand this shell ES may be reinforced internally by imbedded fabric, metal gauze, or other reinforcing means as known to the prior art for tubular structures of the charactristics here desired. Jointly with or alternatively to such internal reinforcing there may be further provided an external mesh 64 covering, or as part of, the elastomer shell ES; the mesh 64 in effect an external tube, being also held captive by the respective end assemblies AS. The mesh sleeve 64 may serve both as reinforcement maintaining the total interior volume of the elastomeric shell and, of course, to minimize abrasive wear on the shell in the environment of use.

In constructing the device of FIG. 15, various expedients may be used as previously stated. With some modern adhesives it appears that reliance may be placed entirely upon pre-coating the ends of the shell and the bellows sleeve and then force-inserting them into their respective grooves. Further, by the physical design here present it is also possible with or without pre-application of adhesives or sealing material to the sleeve and shell ends, to swage, roll or otherwise work the external circumference of discs 60 inwardly thereby contracting the metal circumferentially radially inwardly narrowing the groove, near its open end particularly, thereby firmly to grip and anchor the shell received therein; and likewise to expand the metal of the disc about the fluid passageway outwardly, similarly to work the metal into a gripping engagement with the end of the bellows sleeve received in the inner groove.

Moreover, the design of the end cap assembly may include structure as shown in FIG. 15A, wherein the body may have a deeply slotted cylindrical rim flange to receive the flexible shell ES therein bond by adhesive, with or without working of the metal to more firmly grip the shell end; with the inner side of such flange threaded near the radial end wall of the body to accommodate bellows end anchoring means such as shown and described for FIG. 1D; with the outer face of the body provided with a female threaded short tubular extension for connection of a coupling device.

Extending this concept, the terminal portion of fuel hoses especially in and about airport facilities but in other locations as well may advantageously have the general form described relative to FIG. 15, to locate the shock absorber immediately before the valved nozzle at which hammer or shock is likely to originate. Thus where the hose may represent the terminal portion of fuel piping actually hundreds of feet long a 25 or 50 foot long terminal portion of the hose may advantageously incorporate the essential structure of FIG. 15; but even fuel tank trucks may well use a like, though shorter, terminal portion for fuel hoses.

In the elongated device shown in FIG. 16, intended primarily as a supply connection between the male-threaded ends of roughed-in piping and a plumbing fixture such as a water closet flush tank, or a faucet of a lavatory, sink or the like, the bellows sleeve B and the elastomeric shell ES may be of such material and structure as previously described, and may be connected to the metal end caps 66 much in the manner as described with respect to FIGS. 15 and 15A. Here, however, a central flexible water conducting tube T, e.g., of soft copper or brass or the like, extends coaxially through the device being sealed and secured where it passes through end caps 66. The tube T here has an ordinary circular or round wall cross section, but between the end discs 66 it has a plurality of perforations or metering apertures spaced therealong to communicate with the spaced interior of the bellows sleeve B.

The projecting opposite ends of the tube T are then provided with coupling nuts 67 each including an O-ring or other suitable seal ring 68 therein whereby a water tight connection is made when the projecting end of the tube is inserted into the threaded end of a pipe or a faucet onto which the coupling at 67 is then tightened up to effect a seal by compression of the ring 67 between the pipe or faucet end, the nut and the tube.

So that a given unit size may as usual be adaptable for installation in various places, one or both projecting ends are of suitable excess length to be cut off as required for a particular installation. In this case the flexible character of the shell, of the tube T and the bellows allows accommodation to off-set or misalignment between the end of the pipe and fixture to be connected thereto. The device thus serves in the first instance as a supply connection and secondly as a water hammer arrester located quite close to a valve which is likely frequently to be quickly closed and thereby give rise to shock or water hammer in the lines.

In devices such as those of FIGS. 15–16, the elongated shell ES could also be provided by flexible metal tubing, i.e., sufficiently bendable without kinking to be useful in accommodating off-sets or angular dispositions of the axes of the connection portions of elements joined; but the metal or components of the disclosed devices generally is non-stretching in the sense that under the operating conditions for the intended use, no volume change of practical consequence results by tensile strain.

In many plumbing systems, particularly in public buildings, schools, or the like, branch water supply lines serving a plurality of fixtures, such as a battery of flush toilet bowls, flush tanks, lavatories and the like, each include so-called supply valves, usually gate valves, which are normally kept open long periods of time, and closed only at such times as maintenance may be required on the branch. Since it is desirable particularly in such branch lines to include one or more water hammer arresters, the two devices would be quite advantageously embodied in one.

Inasmuch as water hammer is likely to or can arise in the branch only at such times as the valve is open, a valve device of FIG. 17 embodying the invention is useful for such purposes. On the top of the valve body, there is secured as an elongated bonnet structure an upright water hammer arrester generally of the FIG. 1 type, with the bottom and top walls suitably modified respectively for securement to the top of the valve body, and reception of an elongated threaded rising valve stem passing coaxially up through a partially internally threaded sleeve 35 extending through the bellows sleeve and top wall and sealed by the necessary valve stem packing arrangement P at the top of the shock absorber structure. Here charging device 25 is located in the top wall; and a FIG. 2 type bellows is shown as anchored by the structure of FIGS. 1C–1D, though others could be used. The bottom wall has a depending skirt threaded to screw onto the valve body in place of the standard bonnet, and in addition to a central aperture in which the bottom end of stem sleeve 35 is secured, against rotation, e.g., by brazing, has a plurality of inlet apertures 36 putting the valve body flow space in communication with the bellows interior. The sleeve 35 need not be secured to the top wall, but may be flanged for centering within the bellows anchoring device.

With a valve of this character included in a supply line, it being normally open, there is access of the water up through the valve body around the gate and stem through apertures 36 to the interior of the bellows B. Hence upon any sudden stoppage or rapid decrease or closing of a downstream valve, the water hammer arresting function of this valve device will come into operation.

On the other hand with respect to many types of check valves, the construction of which includes a capped top opening, through which the movable check valve elements and other components may be inserted in fabrication and reached upon removal of the cap or cover for servicing, as shown in FIG. 18, the device of FIG. 1 may be again modified by use of an appropriate bottom end wall which can serve also as the cover plate for the check valve. Since such opening is located on the normally down stream side of the valve seat, that is, the side on which water hammer arises by virtue of sudden valve closing to check a reversed flow, a substitution in the valve design of such a water hammer arrester component for the usual cover plate is effective for the intended purposes. In FIG. 18, the shock absorber unit differs from FIG. 1 only by having the male-threaded inlet connection 24a of such diameter that it may be threaded into the top opening of the valve body in place of the standard cap or cover of such a valve with the cylindrical wall of shell S secured on the bottom element within an upward circumferential flange 37, which externally may be provided with wrench flats or spanner holes for tool engagement.

Though the bellows type of FIG. 7, i.e., of the general arrangement of FIG. 13, can be used with the FIGS. 17 and 18 valve combination, generally the higher available volume change of the FIG. 13 form is not required.

It will be noted that the valve of FIG. 17 does not have to be installed with stem upright, even as the aforementioned absorber devices require no specific orientation relative to the gravitational field for proper operation, in contrast to many prior devices.

Hereinafter for simplicity in the claims the phrase "hydraulic component" will be used to comprehend various devices to which a unit may be connected as valves, faucets, pumps, appliances, hoses, tanks, fixtures or others having liquid conveying connections.

Also a device of structure in accordance with the present invention is well suited to serve as an accumulator on a hydraulic system, especially the devices of FIGS. 1–14, with aptly chosen bellows strength; for example, for maintaining constant pressure; or for storing liquid under pressure, as, for example, an "in-wall" installation at a residential water closet with a flush valve to ensure adequate flushing flow despite small size supply piping. In conjunction, for example, with pumps, giving rise to pulsations or harmonics as well as noises, or other devices giving rise to cavitation noises either the single connection types or the in-line or through-flow types as above described may serve to minimize the effects of such phenomena, though in particular environments one particular form may be preferable.

I claim:

1. A shock absorber unit for a liquid conveying line,
a hollow tight casing having opposite end walls and an enclosing wall joining the end walls,
said casing being substantially non-expansible under operating conditions to define a substantially fixed internal volume; said casing liquid and gas-tight except for the hereinafter described passages,
a bellows sleeve of flexible material impermeable to the liquid in such line and to a pressurizing gas,
said bellows sleeve having opposite ends anchored to said end walls respectively to divide the interior of said casing into two variable space regions internal and external of the said bellows sleeve respectively;
a charge of pressurizing gas contained in one of said space regions;
one of said end walls having therethrough a liquid passage to the other said space region;
and means on said one end wall for connecting said unit to, and with said passage communicating with, said line;
said bellows sleeve over substantially its entire length having formed therein like longitudinal pleats or corrugations presenting in the unstressed sleeve a closed-curve sinuous cross-section in which the shape of the troughs is similar to the shape of the crests, the bellows sleeve being free over substantially its entire pleated length to contract in cross-section with the pleat surfaces on opposite sides of each trough folding toward each other,
whereby the volume of the bellows sleeve may change by radial displacement of the bellows sleeve primarily by flexing with the pleats flattening out for increased volume and approaching or folding toward each other for decreased volume of the bellows sleeve rather than by positive or negative tensile straining of the bellows material and whereby the liquid-shock absorbing action of said unit results primarily by compression of said charge with radial movement of said bellows sleeve upon rise of liquid pressure in said line.

2. A unit as described in claim 1, wherein both said end walls are provided with a respective said means and passage, whereby the unit may be connected into and as a through-flow part of a liquid line.

3. A unit as described in claim 2 having a relatively elongated housing with said enclosing wall a tube flexible for installation purposes and substantially non-stretching under operating conditions.

4. A unit as described in claim 3 wherein said other region is afforded by the interior of said bellows sleeve as a liquid through-flow space.

5. A unit as described in claim 3 wherein the wall tube is formed of an elastomeric material, said bellows sleeve and wall tube have corresponding ends secured concentrically to end caps providing said end walls, said charged region being defined between said sleeve and tube, and said bellows sleeve defining a liquid through-flow space internal thereto as the said other space region.

6. A unit as described in claim 3, wherein said bellows sleeve and wall tube have corresponding ends secured concentrically to end caps providing said end walls, said charged region being defined between said sleeve and tube, said other region is afforded by the interior of said bellows, and including a flexible metal tube providing a liquid through-flow space extending coaxially through said bellows and through and sealed to said end caps, said metal tube having a multiplicity of perforations therealong and therearound putting the liquid through-flow space in communication with the internal surface of said bellows sleeve.

7. A unit as described in claim 6, wherein said flexible metal tube projects endwise beyond each said cap to afford at each end the said means, and having compression coupling-sealing means on each projecting end for connection to threaded line ends or to hydraulic components to be joined to the line.

8. A unit as described in claim 2, wherein the space external to said bellows sleeve is gas-charged, and said bellows sleeve provides a liquid flow path through the unit, said bellows in normal unassembled condition being sufficiently longer than the distance between said end walls, so that in the assembled condition said bellows without kinking provides a tortuous said flow path aiding attenuation of sound transmitted in liquid in a said line.

9. A unit as described in claim 1 in the combination of a check valve, wherein the said one end wall serves as a valve body cap with said passage communicating with the liquid flow space of the body on the downstream side of the valve member thereof.

10. The combination as described in claim 9 wherein the gas charged space region is external to said sleeve.

11. A unit as described in claim 1 in the combination of a stem-operated flow control valve having a valving member moving toward and away from a valve seat within a valve body on rotation of said stem, said unit serving as a bonnet having said one end wall secured on a valve body with said passage in communication with the valve body flow space, said stem extending through the unit coaxially within the bellows sleeve, and having a threaded support on said bottom wall, and said top wall including a valve stem sealing packing device for the valve stem extending therethrough.

12. The combination as described in claim 11 wherein the gas charged space region is external to said sleeve.

13. The combination as described in claim 11 wherein said valve is a gate valve.

14. A unit as described in claim 1 wherein the gas-charged space region is external to said bellows sleeve.

15. A unit as described in claim 14 including a substantially rigid supporting sleeve supported at opposite ends on said opposite end walls in substantially coaxial relation within said bellows sleeve, said supporting sleeve having a multiplicity of apertures providing openings distributed over its length and circumference between the supporting sleeve interior and the bellows interior; said means and liquid passage opening into an end of said supporting sleeve and thereby to the bellows interior.

16. A unit as described in claim 15 wherein both said end walls are provided with a respective said means and passage, whereby the unit may be connected into, and as a through-flow part of, a liquid line.

17. A unit as described in claim 1 wherein the gas-charged space region is internal to said bellows sleeve.

18. A unit as described in claim 1, wherein said passage is provided with an orifice device providing a restricted opening to liquid flow from the unit interior back through said device and a larger opening for freer liquid flow through said passage into the unit.

19. A device as described in claim 18, wherein said orifice device comprises a body ring secured to said one end wall, a centrally perforated elastomeric disc and an underlying foraminous disc, said elastomeric disc peripherally held between said ring and said formaminous disc, and radially slit outwardly from the center perforation at a plurality of spaced locations.

20. A unit as described in claim 1 for each end of the bellows including sleeve means comprising a female threaded cylindrical flange on the interior of a respective said end wall, an external male threaded ring and an internal ring, said rings having respectively an internal and an external periphery adapted in form to each other and to the end of the bellows sleeve for cooperatively anchoring on said end wall the bellows end sandwiched therebetween with said external ring threaded into said flange.

21. A unit as described in claim 1 for each end of the bellows including sleeve means comprising a female threaded cylindrical flange on the interior of a respective said end wall, an external male threaded ring and an internal ring, said rings having respectively an internal and an external periphery adapted in form to each other and to the end of the bellows sleeve for cooperatively anchoring on said end wall the bellows end sandwiched therebetween with said external ring threaded into said flange; and wherein the bellows sleeve in unassembled condition has a uniform cross-section with said corrugations running to the end edges thereof, and the said peripheries are provided with surfaces both sloped parallel to each other and sinuously shaped in circumferential sense to accommodate the bellows end flared outwardly therebetween.

22. A unit as described in claim 1 for each end of the bellows including sleeve means comprising a female threaded cylindrical flange on the interior of a respective said end wall, an external male threaded ring and an internal ring, said rings having respectively an internal and an external periphery adapted in form to each other and to the end of the bellows sleeve for cooperatively anchoring on said end wall the bellows end sandwiched therebetween with said external ring threaded into said flange; and wherein said bellows sleeve in unassembled condition has a uniform cross-section with said corrugations running to the end edges thereof, and the said peripheries are provided with surfaces both sloped divergently to each other and sinuously shaped in circumferential sense to accommodate the bellows end located therebetween and a sheet metal ring having integral internal and external wall portions crimped onto the end portion of the bellows located between said rings.

23. A unit as described in claim 1 wherein the interior of said bellows is gas-charged; and each end portion of said bellows is molded into a circular neck terminating in an outward radial flange, said end portion being secured to a respective end wall by a flat clamping ring sandwiching said flange against the end wall and screws engaged between said end wall and ring.

24. A unit as described in claim 1 for each end of the bellows sleeve including means comprising an internal and an external integral generally cylindrical end wall flange, said flanges having opposed parallel curved surfaces therebetween forming a slot generally complementary to the said end of the bellows, and means securing the bellows end therebetween.

25. A unit as described in claim 24, wherein the bellows is of uniform cross-section to its very ends in normal unassembled condition and the opposed parallel curved surfaces of the said flanges are sinuously shaped to mate with the internal and external peripheries of the bellows end, the means securing the bellows end comprising an adhesive.

26. A unit as described in claim 24, wherein said bellows ends are molded to a cylindrical form; said flanges have generally cylindrical opposed surfaces with that of the external flange female-threaded, said means comprising a male-threaded ring threaded into said external flange and having an internally peripheral wedging surface clamping the bellows end against the internal flange.

27. A unit as described in claim 1 wherein each end wall comprises an end plate to which a respective end of said bellows sleeve is secured, said plate for said one end wall having on its external face a chamber extending over substantially the major area of the plate and terminating in a threaded tubular formation providing said means, and a plurality of apertures from said chamber through the last said plate externally of the location of securement of the bellows and thereto, said bellows being internally gas-charged.

References Cited

UNITED STATES PATENTS

| | | | |
|---|---|---|---|
| 2,448,118 | 8/1948 | Pellettere | 138—30 |
| 2,875,787 | 3/1959 | Evans | 138—30 |
| 3,065,766 | 11/1962 | Wenzl | 138—30 |
| 3,331,399 | 7/1967 | Von Forell | 138—30 |

HENRY T. KLINKSIEK, Primary Examiner

WILLIAM R. CLINE, Assistant Examiner

U.S. Cl. X.R.

138—30